United States Patent [19]
Lewis et al.

[11] Patent Number: 5,748,881
[45] Date of Patent: May 5, 1998

[54] METHOD AND APPARATUS FOR A REAL-TIME DATA COLLECTION AND DISPLAY SYSTEM

[75] Inventors: Brian T. Lewis; Graham Hamilton, both of Palo Alto, Calif.

[73] Assignee: Sun Microsystems, Inc., Mountain View, Calif.

[21] Appl. No.: 552,971

[22] Filed: Nov. 3, 1995

Related U.S. Application Data

[63] Continuation of Ser. No. 958,624, Oct. 9, 1992, abandoned.

[51] Int. Cl.$^6$ .................................................. G06F 11/00
[52] U.S. Cl. ................................. 395/184.01; 345/336
[58] Field of Search ..................... 395/184.01, 650, 395/700, 155; 364/267.2; 345/334, 335, 336, 338, 339, 340, 347

[56] References Cited

U.S. PATENT DOCUMENTS

| | | | |
|---|---|---|---|
| 4,774,661 | 9/1988 | Kumpati | 364/300 |
| 4,885,717 | 12/1989 | Beck et al. | |
| 5,021,995 | 6/1991 | Quint et al. | 364/900 |
| 5,166,951 | 11/1992 | Schilling | 375/1 |
| 5,175,810 | 12/1992 | Young et al. | 395/148 |
| 5,243,665 | 9/1993 | Maney et al. | 382/8 |

FOREIGN PATENT DOCUMENTS 2100439   12/1982   United Kingdom .

OTHER PUBLICATIONS

"Object Linking Embedding" Extensible Application Protocols, Microsoft Corporation, Nov. 6, 1991, pp. 1–14.

Andrew J. Palay et al., "The Andrew Toolkit—An Overview," *Proceedings of the Winter 1988 USENIX Conference*, Feb. 11–12, 1988, pp. 9–21.

R.D. Trammel—Tektronix (Visual Systems Group), "The Big Picture: Visualizing System Behavior in Real Time," *Proceedings of the Summer 1990 USENIX Conference*, Jun. 11–15, 1990, pp. 257–266.

Frank Lange, et al., "JEWEL: Design and Implementation of a Distributed Measurement System," German National Research Center for Computer Science (GMD), pp. 1–16 (date unknown).

Dieter Wybranletz et al., "Monitoring and Performance Measuring Distributed Systems During Operation," *Proceedings of the 1988 ACM Sigmetrics Conference on Measurement and Modeling of Computer Systems*, May 24–27, 1988, Santa Fe, New Mexico, Special Issue vol. 16, No. 1, pp. 197–206.

James Kempf et al., "Cross–Address Space Dynamic Linking," Sun Microsystems Laboratories, Inc., Mountain View, CA, (date unknown).

(List continued on next page.)

*Primary Examiner*—Hoa T. Nguyen
*Attorney, Agent, or Firm*—Finnegan, Henderson, Farabow, Garrett & Dunner, L.L.P.

[57] ABSTRACT

A method and apparatus are disclosed which provide solutions to the problems which are encountered in an object oriented, distributed computer system in which attempts are made to monitor and display performance characteristics of objects in the system, where no prior knowledge of the objects exists. The invention disclosed herein is a generic monitoring and display system which can obtain performance data from and about objects and display the data in an appropriate manner without having to create special one time data acquisition and display programs, and which can select an appropriate display type based upon a display indicator contained in the captured data. Additionally, a tabular object is disclosed which can be used by operating objects to facilitate operating data collection and reporting.

18 Claims, 6 Drawing Sheets

OTHER PUBLICATIONS

Takao Shimomura et al., "VIPS: A Visual Debugger For List Structures," *Proceedings, The Fourteenth Annual International Computer Software & Applications Conference,* IEEE Computer Society Press, Oct. 31–Nov. 2, 1990, Chicago, IL, pp. 530–536.

D.P. Pazel, "DS–Viewer—An interactive graphical data structure presentation facility," *Sun Systems Journal,* vol. 28 No. 2, (1989), pp. 307–322.

Robert Robson, "Visual Editing of Data Structures," *Proceedings, Conference on Softwaqre Maintenance 1991,* Oct. 15–17, 1991, IEEE Computer Society Press, Sorrento, Italy, pp. 228–235.

Allen Tuchman et al., "Run–Time Visualization of Program Data," *Proceedings Visualization '91,* IEEE Computer Society Press, San Diego, CA, Oct. 22–25, 1991, pp. 255–261.

METHOD AND APPARATUS FOR A REAL-TIME DATA COLLECTION AND DISPLAY SYSTEM

This is a continuation of application Ser. No. 07/958,624, filed Nov. 9, 1992, now abandoned.

BACKGROUND OF THE INVENTION

The present invention relates to the fields of distributed computing systems, client-server computing and object oriented programming. Specifically, the present invention is a method and apparatus for providing client programs the ability to use references to objects to monitor and display attributes of object performance and other data on a real time basis without any prior knowledge of the object's characteristics, and with minimal interference to the object's performance.

BACKGROUND

In an object oriented system, an object is a component comprising data and operations which can be invoked to manipulate the data. The code which may be executed to perform a requested operation is called a "method". The operations are invoked on a target object by sending requests to the target object. A request may have parameters that are used to pass data to the target object, as well as a request context which provides additional information about the request. Upon performing the request the object returns results to the client. Each object has an object type. The object type defines the operations that can be performed on objects of that type. The object operations are implemented independent of the objects themselves. Additionally, one object type may inherit the object operations defined and implemented for other object types. An object implementation, or "implementation" for short, is a definition that provides the information needed to create an object and to allow the object to participate in providing an appropriate set of operations. An implementation typically includes, among other things, definitions of the operations upon the state of the object, as well as information about the intended type of the object. For further description of object oriented design and programming techniques see "Object-oriented Software Construction" by Bertrand Meyer, Prentice-Hall 1988.

An interface is a description of a set of possible operations that a client may request of an object. Specifically, an interface is a listing of the operations and attributes that an object provides. This includes the signatures of the operations and the types of the attributes. The signature of an operation defines the parameters of the operation including their number, data types, and passing mode, the results if any, and the possible outcomes (normal vs. exceptional) that might occur. An attribute is a value that is associated with an object, which is made visible to a client by a pair of "get" and "set" operations. An interface is also called an object interface or an object's interface. An object satisfies an interface if it can be specified as the target object in each potential request described in the interface. Interfaces are specified in an Interface Definition Language ("IDL"). Interface inheritance is the construction of an interface by incremental addition of other interfaces, and provides the composition mechanism for permitting an object to support multiple interfaces. IDL provides interface inheritance. Interface definitions are maintained in an interface repository as a set of interface specification objects which are accessed through a set of IDL specified interface definitions for the repository. An interface object is an object that serves to describe an interface. An interface repository may be thought of as "directory software" that manages the storage, distribution, and management of interface specifications. IDL obeys the same lexical rules as C++ and provides full support for C++ preprocessing features.

In client-server computing, typically there is a set of computers that can communicate with one another through a network connecting the computers. Some of these computers act as providers of services or functions to other computers. The providers of such service or functionality are known as "servers", and the consumers of such service or functionality are called "clients". The client-server model also generalizes to the case where distinct programs running on the same computer are communicating with one another through some protected mechanism and are acting as providers and consumers of functionality.

In object oriented distributed systems based upon the client-server model, there exist servers that provide object oriented interfaces to their clients. These servers support objects consisting of data and the associated operation code. Clients may obtain access to these objects and may execute requests (sometimes referred to as calls) on them. These requests are transmitted to the server from the client. At the server these requests are executed via the operations code associated with the object. The results of these requests are then transmitted back to the client.

There is often a need for programmers to be able to observe in real-time the performance and behavior of both system and application software. This is done to tune and debug software components, and to understand how the components behave as part of larger software systems. The need for this is especially great when developing distributed software, where the various software components can interact in complex and sometimes unexpected ways. Within object oriented, distributed systems, traditional systems of data collection for performance monitoring and debugging do not support real-time instrumentation, and only provide off-line services. Such traditional systems included a) software based trace mechanisms which generally required rebuilding the software components to either include new, specially written trace code or to enable trace code that had been previously written; or b) specialized hardware instrumentation devices which could be attached to the computer system on which the target program was running.

In either of these cases, the raw trace data is generally collected and processed after the fact by some other program that displays the trace data for a programmer. This allows the programmer to review and analyze the data.

Despite the need to understand what software is doing, relatively few software systems make available information about their operation. There are a number of reasons for this. Additional code typically has to be written to support the instrumentation. There is some runtime overhead, which becomes more significant when a large amount of information is generated. Also, tools to analyze and display the information have to be written. The display tools are often custom written because they must provide specialized displays for the instrumentation data of each program. The lack of standard data formats for instrumentation also forces new tools to be written for each new program and each new type of instrumentation data to be observed. Since the display tools must be custom written, there is usually a lag between the time when the need for a new tool is recognized and when that tool is available. Furthermore, both the instrumentation code and the specialized display tools have to be maintained when the program evolves. Even when programs have been instrumented, the instrumentation support is often not maintained when the original programmer moves on.

Systems that support observation in real-time using only software are rare, primarily because of the impact such instrumentation has on the observed program. Some systems use hardware to limit the impact of instrumentation; hardware assistance is most often used when doing performance monitoring for parallel and distributed programs, especially when very fine-grained monitoring is done.

KATO is a real-time software based performance observation system for UNIX®. (UNIX is a registered trademark of UNIX Systems Laboratories, Inc.) A major design goal was to reduce the impact on the observed program as much as possible. It does this by running only raw data collection on the observed machine and using a program running on a separate machine to do the data analysis and display; a local area network and a custom datagram protocol are used to transmit measurement data. KATO supports a fixed set of graphical displays. It requires modifications to the UNIX kernel to support the instrumentation. Kernel data structures are passed verbatim to the display tools, which creates a major problem of keeping KATO versions synchronized with versions of the UNIX kernel.

The Jewel system has been used to do performance measurement in Amoeba and MACHE™ 3.0. (MACH is a trademark of Carnegie Mellon University.) It is software-based (does not rely on special hardware) and attempts to reduce the interference of online performance measurement as much as possible. Each type of event is generated only if some tool has registered interest. As much event processing as possible is done off the observed machine, and a separate local area network is used for the measurement information. Measurement data is represented using a standard data format. A variety of display devices are used to show the performance data; these are combined into specialized display tools using a user interface programming language.

A diagramming debugger system for graphically representing operation of object oriented programs is disclosed in U.S. Pat. No. 4,885,717 to Beck et al. This patent discloses a system which captures the messages sent from a transmitting object to a receiving object along with the object names and uses this data to display boxes and connecting lines on a computer screen representing the objects and messages. The display of the boxes and lines only shows the sequence of messages. This means the system cannot display other operating data which may have been collected by the operations of an object concerning the object's performance or other behavior.

The system and process disclosed in the present invention, unlike the KATO and Jewel and similar systems, and unlike the fixed display of boxes and lines disclosed by the Beck et al patent, can be implemented in software with minimal programmer effort, without expensive special purpose instrumentation hardware, and with minimal run time cost. Moreover, the present invention can monitor and display data from target objects about which the monitoring and display system of the present invention had no prior knowledge. Various kinds of operating data from the object can be displayed in a variety of generic display instruments. Furthermore, display hints in the collected data suggest the preferred way to display each kind of data to the user.

SUMMARY OF THE INVENTION

A method and apparatus are disclosed which provide solutions to the problems which are encountered in an object oriented, distributed computer system in which attempts are made to monitor and display performance and other operational characteristics of objects in the system, where no prior knowledge of the objects exists. The invention disclosed herein is a generic monitoring and display system which can obtain performance and other data from and about objects and display the data in an appropriate manner without having to create special dedicated data acquisition and display programs, and which can select an appropriate display type based upon a display indicator contained in the captured data. The invention thereby makes available to program developers as well as other users a readily available means to see what is happening within a computer system by displaying certain data without having to write or develop new data collection or data display routines.

The present invention provides a real time monitoring and display process having generic data acquisition programs for accessing other operating programs, and generic display programs for displaying the acquired data in a number of ways. The data acquisition and display process includes acquiring data from a target program using a generic data capture system; generating a graphic representation of the acquired data; and displaying the graphic representation. In this manner, a user may display data from a target program without the need to create a new data acquisition and display program. Preferably, the data acquisition step includes the ability to determine that a monitoring method is available which can be used to acquire the data from the target program. In addition, the step of determining whether a monitoring method can be found is preferably performed by accessing a program type information registry to find the target program's type which indicates the kind of monitoring methods the target program employs, and preferably selecting therefrom a tabular program monitoring method.

The generation of a graphic representation of the acquired data preferably is based upon a display indicator contained in the acquired data which provides a hint as to the best type of display for this data. In one embodiment of the invention, the computer programs are object oriented programs. Additionally, the data acquisition and display system may preferably make use of a monitoring method of a tabular object.

In an additional embodiment of the invention, the data acquisition and generic display system are realized in a computer system apparatus. Additionally, the computer system may be a distributed computer system. In still another embodiment of the invention, the data acquisition and generic display system are realized in a computer program product. Additionally, the computer program product may contain programs which can operate on object oriented programs.

The present invention also comprises the tabular object itself which is claimed as an individual and unique generic data collection mechanism.

The generic data acquisition and display system were developed originally to provide real time monitoring and display of object oriented programs having a tabular object monitoring method. However, the performance advantage of the present invention is useful in other applications as well. For example, in any computer system where a monitoring method can be found to monitor the performance of a target object or program.

DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The following disclosure describes solutions to the problems which are encountered in an object oriented, distributed computer system in which attempts are made to monitor and display performance characteristics of objects in the system in real-time. Such problems become more intense when the objects are unknown until system run-time or when the monitor and display system has no a priori knowledge of the target object. The invention disclosed herein is a monitoring and display system which can obtain performance data from and about objects and display the data in an appropriate manner without having to create special ad hoc data acquisition and display programs.

Figure 1:
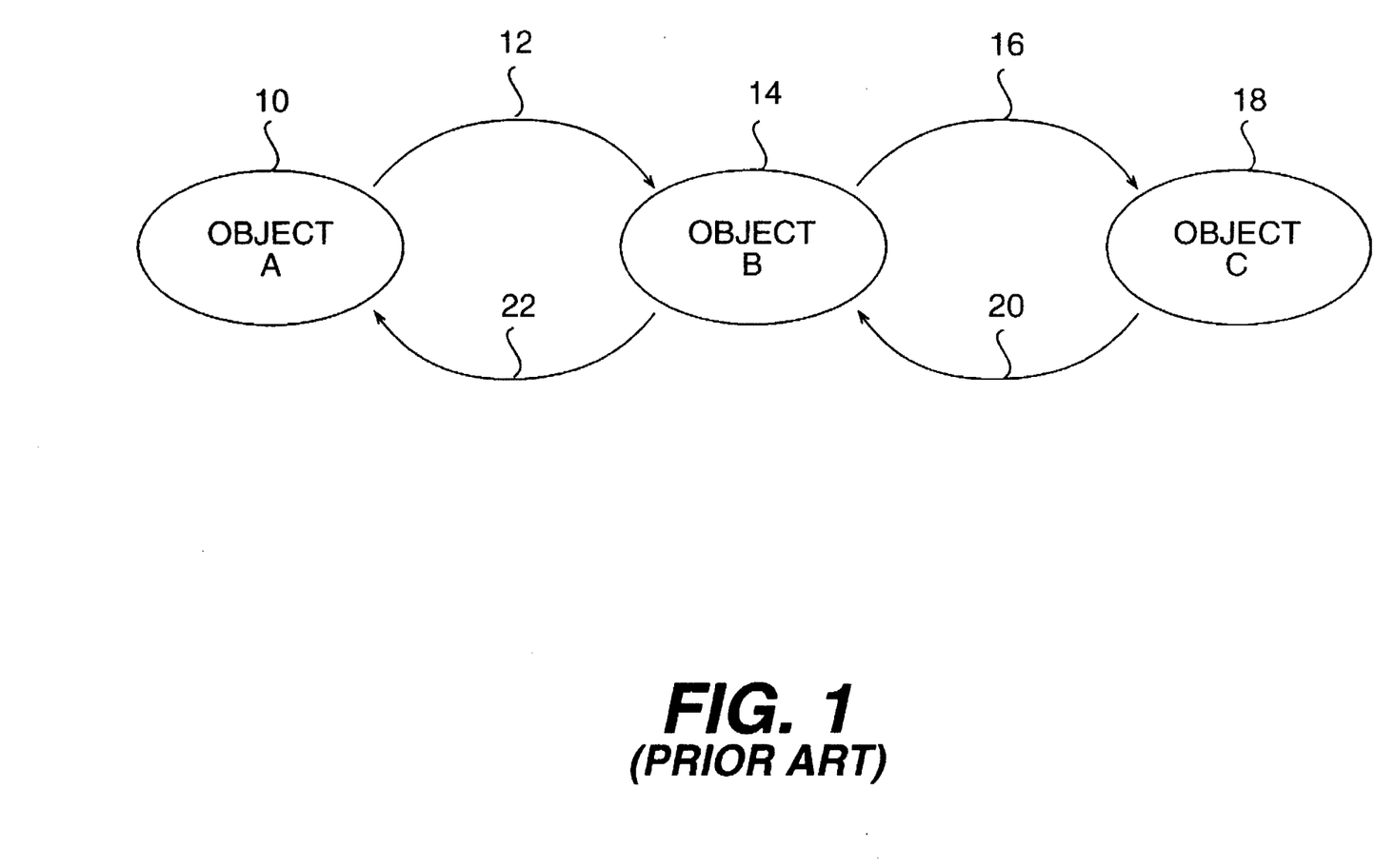
FIG. 1 illustrates the general prior-art relationship of objects in an object-oriented system.

As described in the background section above, object oriented systems and some data capture and display systems are known in the prior art. For purposes of illustration, FIG. 1 depicts the general case in an object oriented system where an object A 10 may issue a call or invoke a method 12 on object B 14, which in turn may issue a call or invoke a method 16 on object C 18. Object C 18 will return the results 20 to object B 14 who will in turn, return an appropriate result 22 to object A 10 completing the transaction.

Figure 2:
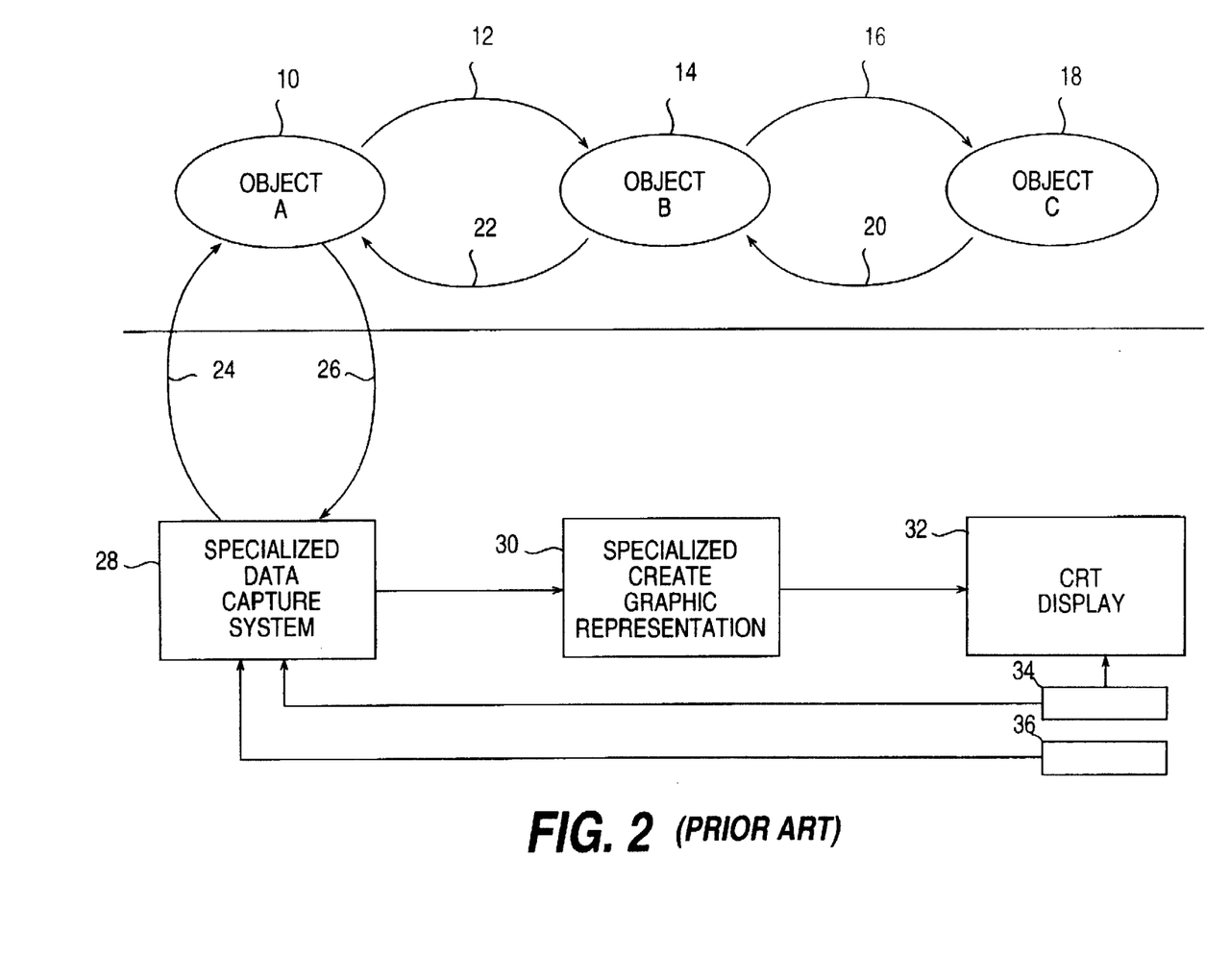
FIG. 2 illustrates the general approach in the prior-art to object monitoring, data capture and display.

Referring now to FIG. 2, the general approach to real-time data capture and display is illustrated. It is the usual case that a programmer or designer decides before-hand, that certain data about an object is to be captured and displayed. Having defined the specific data of interest, the programmer will then create a special program, such as the specialized data capture system 28, which will communicate 24, 26 with the target object 10 to obtain the desired data. The object in question may be designated either by a mouse 34 connected to the display 32 and the specialized data capture system 28, or by typing the object's name or designation on the keyboard 36 which is connected to the specialized data capture system 28. The programmer will also typically write an ad hoc program to take the captured data and create a specialized graphic representation of the data for display on the computer screen, which appropriately indicates the nature of the phenomenon being measured. This program is represented in FIG. 2 by boxes 30 and 32. The system described in the BECK et al '717 patent mentioned previously, is of this type. The diagramming debugger of BECK was created specifically to capture object names and message types and to create a specific "box and arrow" graphic representation to display the messages being sent between objects.

Figure 3:
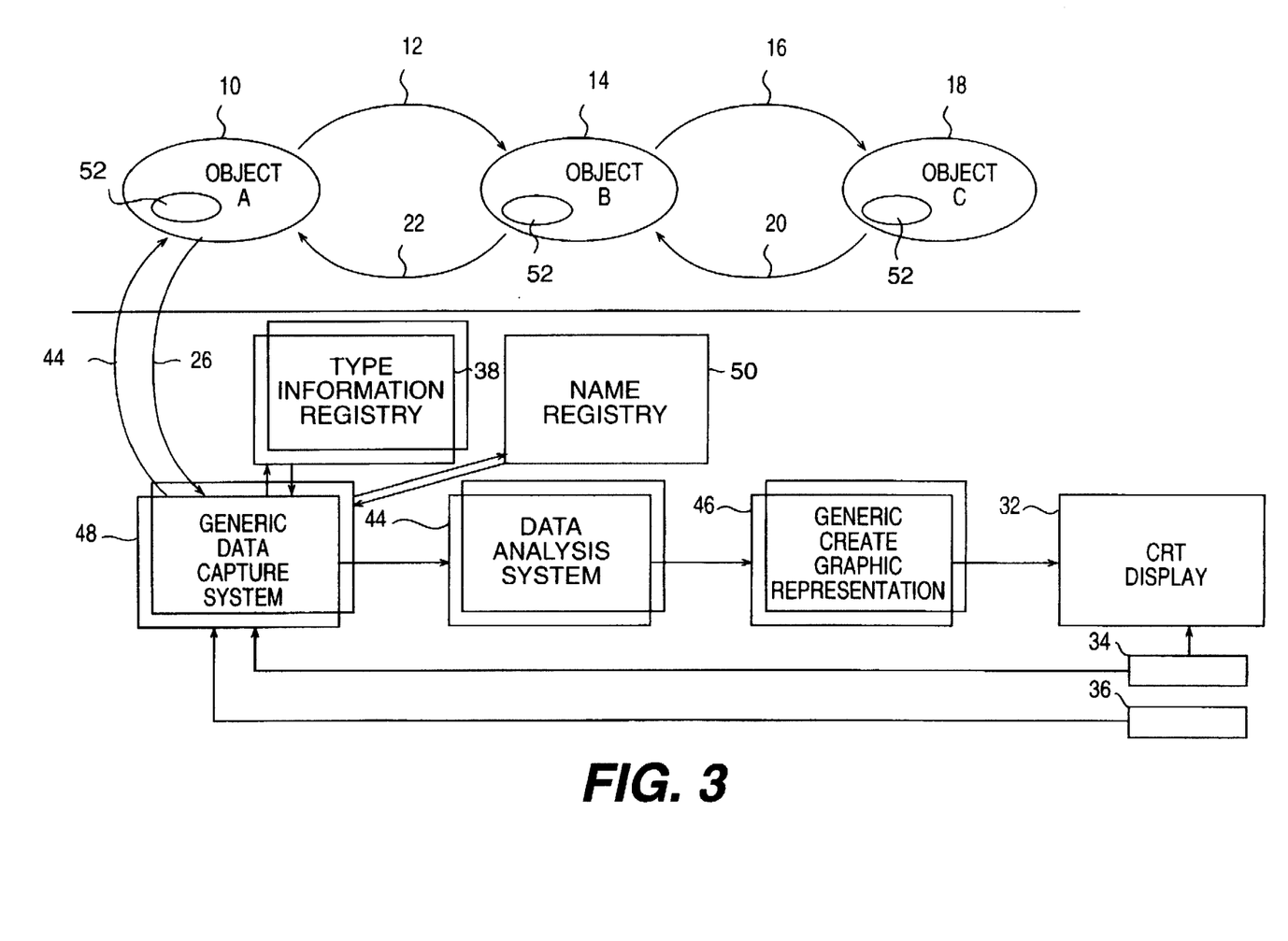
FIG. 3 illustrates the approach of the present invention to the generic capture of data from unknown objects and creation of generic displays.

The present invention is illustrated in FIG. 3. Again a target program or object may be selected by either a mouse 34 connected to the display 32 and a generic data capture system 48 or by typing the program or object's name or reference on the keyboard 36 connected to the generic data capture system 48. The generic data capture system 48 may interrogate a name registry 50 to find a program or object reference if a reference was not provided by the user. The generic data capture system 48 then interrogates a "type information registry" 38 to ascertain the object type or program type of the target object or program (hereinafter "target object" will refer to both). The target object "type" will indicate whether the target object is a tabular object, in which case a tabular object monitoring method can be used to acquire data from the target object. If the "type" obtained for the target object does not indicate that the target object is a tabular object, another monitoring method must be found. The generic data capture system 48 then invokes the selected monitoring method 40 on the target object 10 which may have associated with it a tabular object 52. The results 42 of the method invocation 40 are returned by the target object 10 to the generic data capture system 48. These results contain data which includes a display indicator or hint about how to appropriately display the data. These data are passed to the Data Analysis System 44 which is able to evaluate the display indicator and tell the Generic Create Graphic Representation system 46 what kind of display instrument to use for this set of data. The present invention therefore is a generic data capture and display system which does not have to be rewritten or modified for every different type of data which a programmer might wish to observe concerning an object. Rather, the invention uses the object type code found in the type information registry 38 to invoke measurement methods already contained in a given target object. In most cases this measurement method will be a tabular object method which was inherited by the target object. In some cases, where a target object has not inherited the tabular object and its associated measurement methods, it may be possible to encapsulate the target object with a sub-contract or facet object which can collect some performance data on its own, such as execution times for the object or number of invocations of various of the object's methods, for example.

A more detailed description of an example of the preferred embodiment of the present invention is now presented. The present invention is currently embodied in the Spring operating system, a distributed operating system designed around a microkernel architecture, and a cache-coherent, network virtual memory system. Spring has no user-visible kernel calls. The interfaces for services traditionally implemented as kernel calls are specified in an object-oriented interface definition language that supports multiple inheritance, similar to IDL as defined by the Object Management Group (OMG). An application can request the creation of an object, invoke methods from the interface of an object, and pass an object as a parameter to other invocations, without regard to the location of the object's implementation. Invocations of methods on an object are made via client-side stubs that perform remote procedure calls, if necessary, to the server-side implementation. The stubs are compiled independently of any application and can be dynamically linked to any client that needs them. Accordingly, in this environment, a generic data acquisition and display system would have no prior knowledge of the performance data which a user/programmer might wish to be captured from an object.

Figure 5:
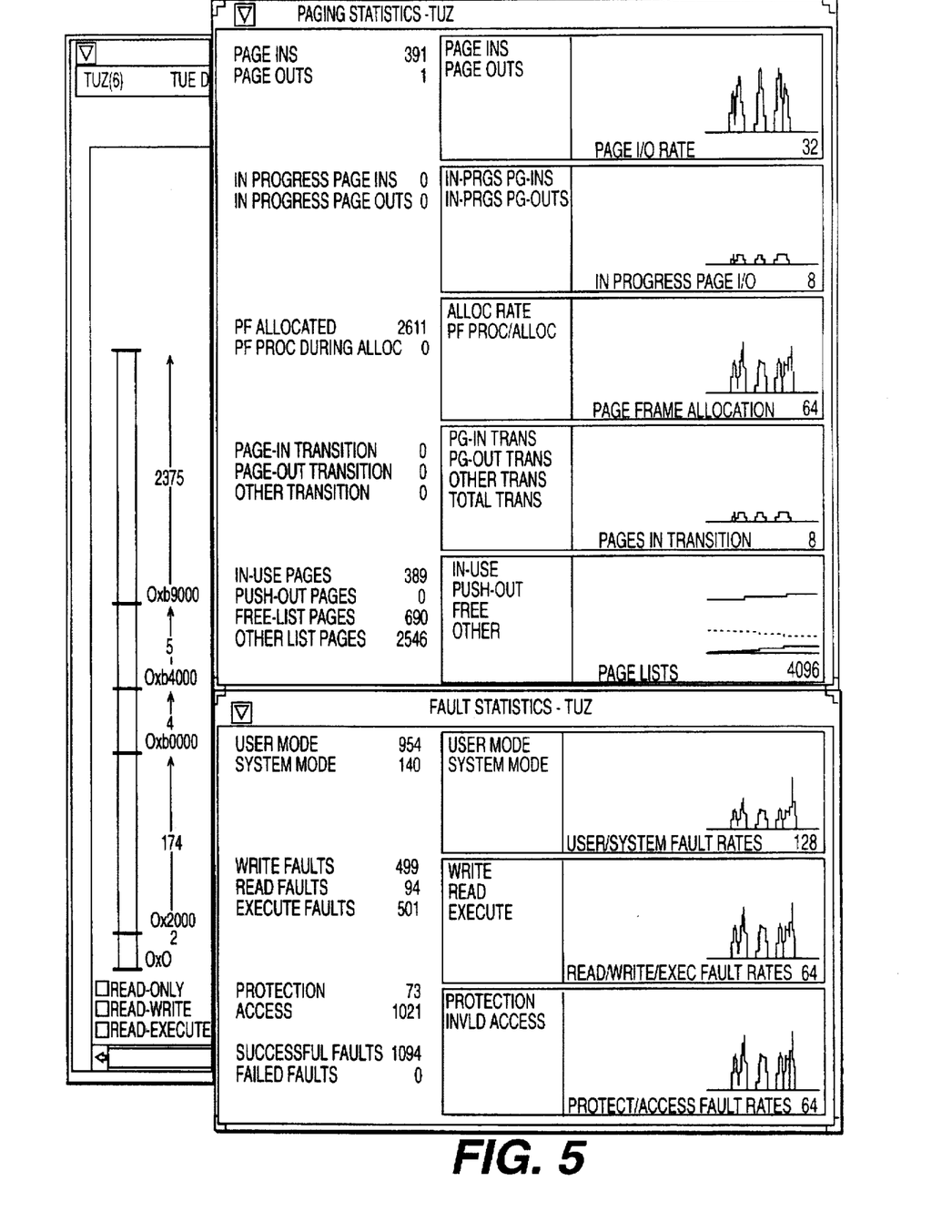
FIGS. 5, and 6 illustrate different types of generic displays used with the present invention.
Figure 6:
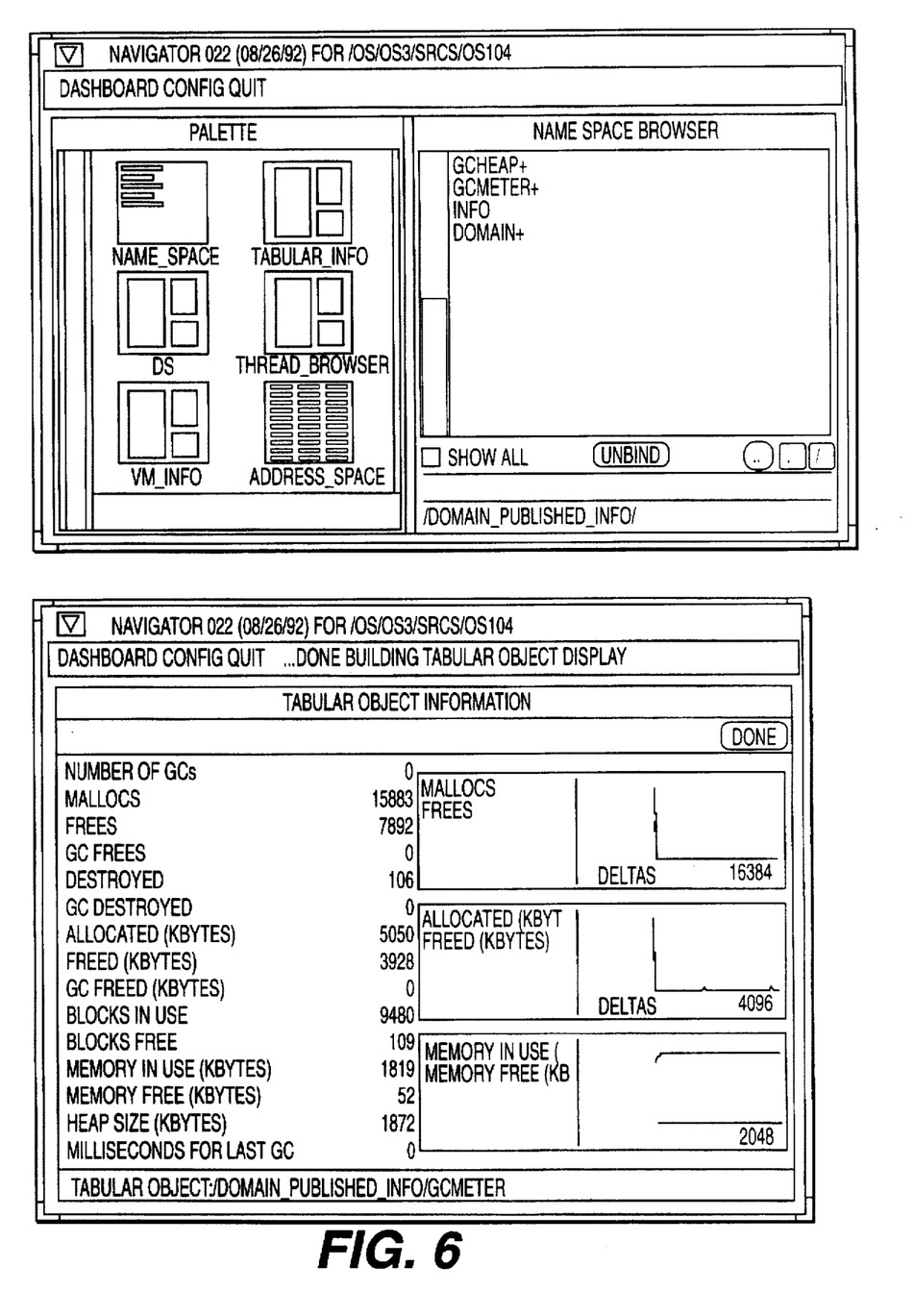

The present invention is an extensible system of Spring services and window based tools based upon the use of this object interface methodology. Spring's primary observability interface is tabular_object. The tabular object interface supports real-time, software-based instrumentation in object-oriented systems. An implementation of an object type can use this interface to make available information about its operation. The tabular_object interface is strongly typed and object-oriented. It describes the methods that an observer program can invoke on a object in order to get, typically at periodic intervals, a sequence of <name, value> pairs provided by its implementation. This information is often statistical: for example, the number of memory pages swapped out or the number of traps handled. Spring uses the tabular_object interface widely; about two thirds of its services currently support it. The tabular_object has low run time cost because its implementation, for example, requires no buffering. To use a tabular_object a programmer needs only to write a few lines of code. Basically, the programmer only needs to incorporate the tabular object and build an array of data names and value slots which can be used to store the data whenever it is collected. Furthermore, the programmer can make use of one of the available tags to affix to each value in the <name, value> list to suggest the best way to display the data, e.g., whether to display a graph over time, or whether the value should be added to previously graphed data, etc. Since the <name, value> list is self-describing (gives a symbolic name and a type tag for each value), it enables the construction of generic display tools that work with objects of a wide range of types. Furthermore, the display hints provided by an implementation allow these generic display tools to provide users with good quality displays. The combination of the tabular_object interface and generic display tools provides an instrumentation system and process which comprise the present invention. FIGS. 5 and 6 illustrate a number of the generic display types which may be used by the generic graphic representation module (46 in FIG. 3) of the present invention.

As an example, in the preferred embodiment of the present invention, the following illustrates how the tabular_object interface and the generic display tools it supports are used for instrumentation where the target object or objects represent a file system. Refer again to FIG. 3. In this example, a file system object has been passed to the generic data capture system 48, for example, as a result of the user typing a name for the file system object on the keyboard 36, which the generic data capture system 48 then looked up in an existing name space registry 50. The generic data capture system 48 then accesses the type information registry 38 and determines that the type of the target file system object A 10 indicates that it is also a tabular object 52. This means that file system implementations must implement all tabular_object methods as well as all file system methods. The generic data capture system 48 accesses the file system's state in the file system implementation, represented in this example by object A 10. The tabular_object interface includes two methods: get_tabular_names() and get_tabular_values(). Two methods are used instead of one because the symbolic names in the list do not change. To build a display for the file system object, the generic data capture system 48 invokes the get_tabular_names() method on the tabular_object just once to get the set of names. It then invokes the get_tabular_values() method to get the initial set of values as well as their types and display hints. It passes this data to the data analysis system 44 and the generic create graphic representation module 46 which use this information to determine which values to show initially and how each value should be displayed (e.g., as a simple counter or as a histogram). The symbolic names are shown to the user to tell them what the values represent. (See FIG. 5 for examples of the display of these names, such as "Page ins" or "Page outs" etc.). The generic create graphic representation module 46 makes its graphical display visible to the user and then enters a loop that updates the display with new values periodically. The user is allowed to override the display hints suggested by the data values in order to change how values are displayed, or to make hidden values visible (and vice versa). The user can also change how often the display is updated. Note that the generic create graphic representation module 46 has no knowledge of the particular type of object it is displaying. It operates on any tabular object, so whether the tabular object is also a file system, or document, or database is unimportant. It can work with objects with a wide range of types. This is in contrast to type-specific display tools of the prior art that work only with objects of a particular type. This description is just one possible example of a use of the present invention. Users skilled in the art can easily envision any number of similar examples of the use of the present invention.

Appendix A contains a detailed listing of the tabular object interface in IDL.

Figure 4:
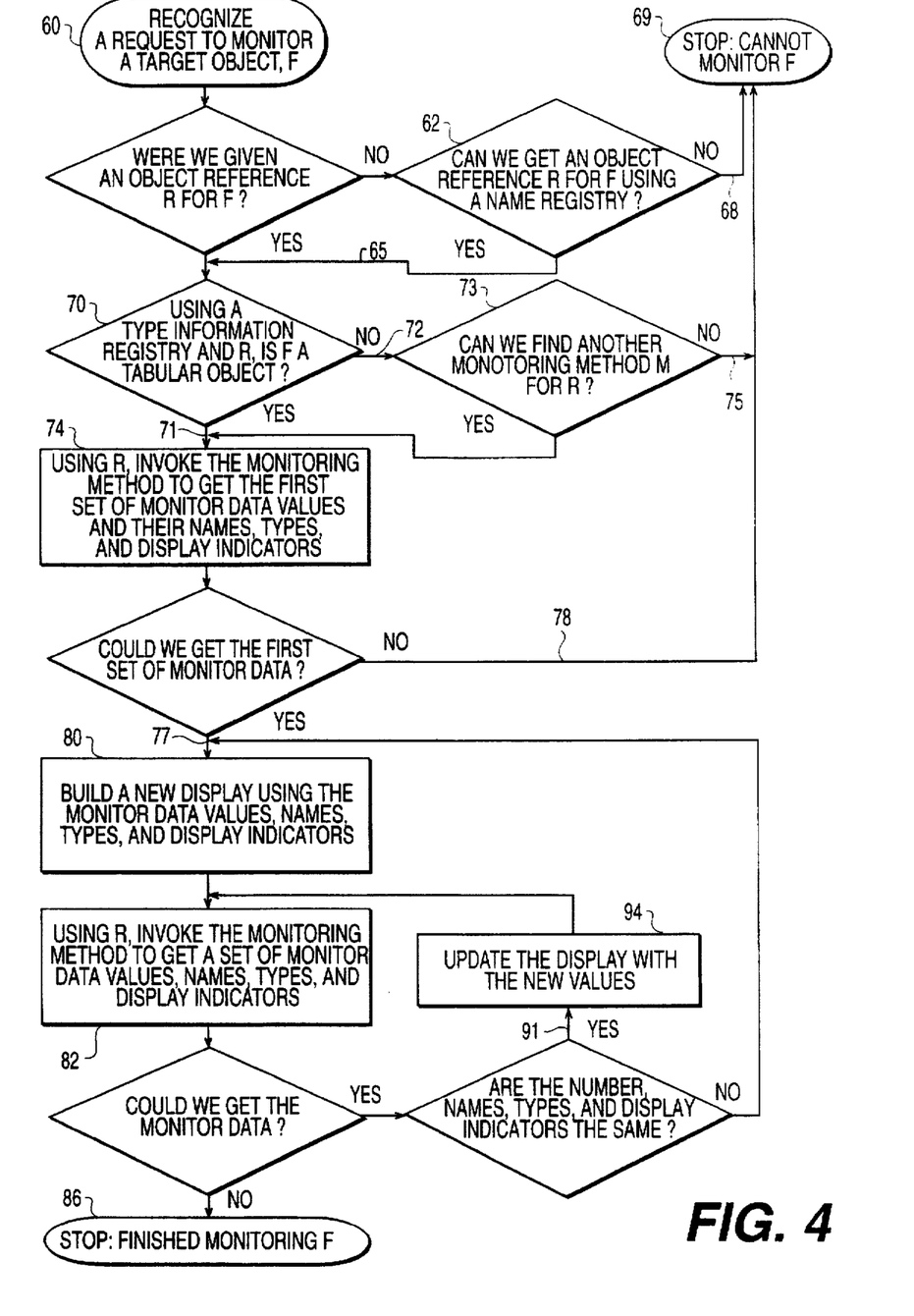
FIG. 4 represents a flow chart of the process used by the present invention to initiate a data monitoring operation and create a suitable display.

Referring now to FIG. 4, a detailed description of the preferred embodiment of the operation of the present invention is described. The generic data capture system (48 in FIG. 3) recognizes a request to monitor an operating object F 60. The system then interrogates a name registry service (50 in FIG. 3) to find an object reference for object F 62. If no object reference is found for object F 68, the system tells the requester that it cannot monitor object F 69. If the object reference for object F is found 65, the system then determines, using the found reference, what object F's type is to determine whether object F's methods include the tabular_object monitoring method 70. If object F's methods do not include the tabular_object monitoring method 72, a test is made to determine if other monitoring methods are available 73. If no other monitoring method is available 75, the system tells the requester that it cannot monitor object F 69. If object F's methods do include the tabular_object monitoring method 71, the system invokes the tabular_object monitoring method on object F to obtain the first set of monitor data values and their names, types, and display indicators 74. If object F returns the expected data 77 the generic create graphic representation module ( 46 in FIG. 3) builds a new display using the monitor data values, names, types, and display indicators (hints) 80. If the expected data was not returned for some reason 78, the user is informed that object F cannot be monitored 69. After the first set of data is obtained and the initial display is built 80, the system periodically invokes the tabular_object monitoring method on object F to get additional values 82, and if the data continues to be acceptable 91, the display is updated with the new data 94 until such time as the system can get no more data or it is told to stop monitoring by the user 86.

While this description of the preferred embodiment describes the situation where the system will not monitor the object F if it has not inherited the tabular_object monitoring method (72 in FIG. 4), an alternative embodiment includes the capability at branch 72 to make a further analysis as to whether some other monitoring method is available for use with the target object F. Several known techniques are available for doing this such as using "facet objects" or similar mechanisms to encapsulate the target object F using the methods of the facet for measurement.

Thus, while a preferred embodiment of the present invention has been shown and described, it will be apparent to those skilled in the art that many changes and modifications may be made without departing from the invention in its broader aspects. The following claims are therefore intended to cover all such changes and modifications as fall within the true spirit and scope of the invention.

APPENDIX A

TABULAR OBJECT INTERFACE IN IDL
© 1992 SUN MICROSYSTEMS, INC. ALL RIGHTS RESERVED.

TABULAR OBJECT INTERFACE IN IDL

```
The following is the current tabular object interface in IDL:
import access;
module tabular_object
{
    typedef sequence<int>     array_int;
        typedef sequence<string>array_string;
        //------Definition of tabular
        values-----------
            enum tabular_value_tag {
    //simple values
    string_value,
    int_value,
    real_value,
    bool_value,
    hex,                //hint: display integer value in hexadecimal
    //hints to display histograms
    graph,              //hint: display integer as histogram
    graph_too,          //hint: display integer in previous graph
```

APPENDIX A-continued

TABULAR OBJECT INTERFACE IN IDL
© 1992 SUN MICROSYSTEMS, INC. ALL RIGHTS RESERVED.

TABULAR OBJECT INTERFACE IN IDL

```
    graph_deltas,       //hint: display rates (deltas) in graph
    graph_deltas_too,   //hint: display rates in previous rate graph
    // hints to hide values initially
            hidden_string,
            hidden_int,
            hidden_real,
            hidden_bool,
            hidden_hex,
    // hints to bracket a group of values (the values for these are ignored)
            start_group,
            end_group,
    // arrays of integers
            array_int_value,
    // sparse arrays of integers represented by pairs <index, value>
            sparse_array_int_value}
    union tabular_value
            switch (tabular_value_tag)
            {
            case tabular_value_tag::string_value:
        string string_value;
            case tabular_value tag::int value:
        long        int_value;
            case tabular_value_tag::real_value:
        double real_value;
            case tabular_value_tag::bool_value:
        boolean bool_value;
            case tabular_value_tag::hex:
        long    hex;
            case tabular_value_tag::graph:
        long    graph;
            case tabular_value_tag::graph_too:
        long    graph_too;
            case tabular_value tag::graph_deltas:
        long    graph_deltas;
            case tabular_value tag::graph_deltas_too:
        long    graph_deltas too;
            case tabular_value_tag::hidden_string:
        string hidden_string;
            case tabular_value_tag::hidden_int:
        long    hidden_int;
            case tabular_value_tag::hidden_real:
        double hidden_real;
            case tabular_value_tag::hidden_bool:
        boolean hidden_bool;
            case tabular_value_tag:hidden_hex:
        long    hidden_hex;
            case tabular_value_tag::start_group:
        long    start_group;
            case tabular_value_tag::end_group:
        long    end_group:
            case tabular_value_tag::array_int_value:
    array_int array_int_value;
            case tabular_value_tag::sparse_array_int_value:
    array_int sparse_array_int_value:
    };
typedef sequence<tabular_value> tabular_value_array;
//----------Definition of the tabular object interface---
interface tabular_object
{
        get_tabluar_names: proc () returns array_string
                raises access.denied
        get_tabular_values: proc () returns tabular_value_array
                raises access.denied
```

What is claimed is:

1. A process for monitoring a target program in a computer system while running programs, the process comprising the steps, performed by the computer system while executing the programs, of:

a. acquiring data from the target program without using any prior knowledge of said data, said data including a display hint suggesting an appropriate way to display said data;

b. determining from said display hint, an appropriate display of the acquired data;

c. generating a graphic representation of the acquired data based upon said appropriate display; and d. displaying the graphic representation.

2. The process of claim 1 further comprising the (additional) step of determining if said acquired data is of a type which said process is capable of displaying.

3. The process of claim 2 wherein the target program provides a tabular object and the monitoring process is a tabular object monitoring process.

4. The process of claim 1 wherein said acquired data includes statistical data.

5. A computer system with a central processing unit (CPU) for executing one or more programs, said computer system comprising:

a) a data acquisition device configured to:
acquire data from a target one of said programs without using any prior knowledge of said data, said data including a display hint suggesting an appropriate way to display said data, and
determine from said display hint an appropriate display of the acquired data;

a graphic representation generator coupled to the data acquisition device and configured to generate a graphic representation of the acquired data based upon said determined appropriate display; and c) a display device, coupled to the graphic representation generator, configured to display the graphic representation of the acquired data.

6. The computer system of claim 5 wherein the computer system is a distributed computer system.

7. The computer system of claim 5 wherein the one or more programs are object oriented programs, and the target program provides a target object.

8. The computer system of claim 7 wherein the target object is a tabular object, and wherein the data acquisition device is a tabular object monitor.

9. The computer system of claim 5 further comprising a display type selector coupled to the generic graphic representation generator for selecting a type of display instrument associated with said display device for displaying the acquired data based upon said display hint.

10. The computer system of claim 5 wherein said acquired data includes statistical data.

11. A computer system having a computer program product on a computer readable medium with computer programs each including computer instructions recorded on said medium, said computer programs being executable by said computer system, said computer system having a display device, at least one CPU, at least one main memory unit connected to the at least one CPU, with the at least one CPU being capable of executing at least one of said programs, said computer system further comprising:

a) a generic data acquisition device configured to:
acquire data from a target program of said at least one program, said data being acquired without using any prior knowledge of said data, said data including a display hint which suggests an appropriate way to display said data, and
determine from said display hint an appropriate display of the acquired data; and b) a generic graphic representation generator coupled to the generic data acquisition device for generating a graphic representation of the acquired data based upon said determined appropriate display, said graphic representation for displaying on said display device.

12. The computer system of claim 11 wherein the computer system is a distributed computer system.

13. The computer system of claim 11 wherein the target program is an object oriented program, and the target program provides a target object.

14. The computer system of claim 13 wherein the target object is a tabular object, and wherein the data acquisition device is a tabular object monitor.

15. The computer system of claim 11 further comprising a display type selector coupled to the generic graphic representation generator for selecting a type of display instrument associated with said display device for displaying the acquired data based upon said display hint.

16. The computer system of claim 11 wherein said acquired data includes statistical data.

17. A method for monitoring a target program and displaying a graphic representation of data using a computer system having a central processing unit (CPU), a memory coupled to the CPU, and a display device for displaying said graphic representation of said data, the data including a display hint from a target program, the method comprising the steps of:

recognizing a request for monitoring said target program;

capturing data from said target program, said data being captured without any prior knowledge of the data, said data including the display hint which suggests an appropriate way to display said data;

determining an appropriate display of the captured data based on the display hint; and generating said graphic representation of the captured data based upon said determined appropriate display; and displaying said graphic representation on said display device.

18. An apparatus for monitoring a target program and displaying a graphic representation of data using a computer system having a central processing unit (CPU) a memory coupled to the CPU, and a display device for displaying said graphic representation of said data, the apparatus comprising:

a selector for recognizing a request for monitoring said target program;

a generic data capture system for capturing data from said target program, said data being captured without any prior knowledge of the data, said data including a display hint which suggests an appropriate way to display said data;

an interrogator for determining an appropriate display of the captured data based on the display hint;

a graphic generator for generating said graphic representation of the captured data based upon said determined appropriate display, said graphic representation to be displayed on said display device.

* * * * *

UNITED STATES PATENT AND TRADEMARK OFFICE
CERTIFICATE OF CORRECTION

PATENT NO. : 5,748,881
DATED : May 5, 1998
INVENTOR(S) : Lewis, et. al.

It is certified that error appears in the above-indentified patent and that said Letters Patent is hereby corrected as shown below:

Title page, item [54] and col. 1, after "FOR" insert --PROVIDING DISPLAY INDICATORS IN--.

Column 11, claim 2, line 11, delete "(additional)".

Column 11, claim 5, line 29, before "a graphic" insert --b)--.

Signed and Sealed this

Twenty-fifth Day of August, 1998

Attest:

BRUCE LEHMAN

*Attesting Officer*     *Commissioner of Patents and Trademarks*